Feb. 18, 1969  B. BULLOCK  3,427,694
FASTENING FOR A VEHICLE SAFETY HARNESS
Filed Jan. 26, 1967  Sheet 2 of 4

Inventor:
Barney Bullock
By Kenyon, Palmer,
Stewart & Estabrook
Attorneys

Feb. 18, 1969    B. BULLOCK    3,427,694
FASTENING FOR A VEHICLE SAFETY HARNESS
Filed Jan. 26, 1967    Sheet 3 of 4

Inventor:
Barney Bullock
By Kenyon, Palmer,
Stewart & Estabrook
Attorneys

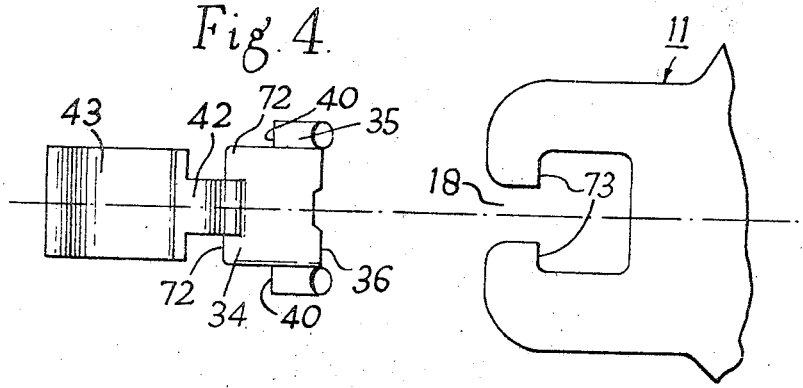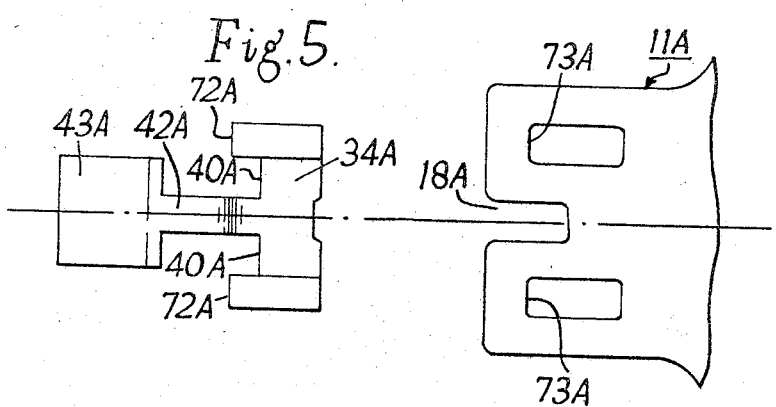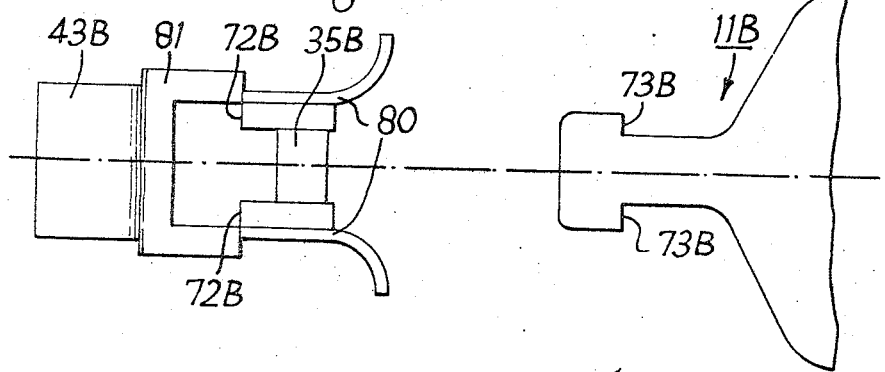

United States Patent Office 3,427,694
Patented Feb. 18, 1969

3,427,694
FASTENING FOR A VEHICLE
SAFETY HARNESS
Barney Bullock, c/o William Deacons Bank, Limited,
Old Brompton Road, London, SW. 7, England
Filed Jan. 26, 1967, Ser. No. 611,970
Claims priority, application Great Britain, Feb. 1, 1966,
4,347/66; Apr. 20, 1966, 17,209/66; Apr. 29, 1966,
18,979/66
U.S. Cl. 24—230                           9 Claims
Int. Cl. A44b 11/00; A62b 35/00

ABSTRACT OF THE DISCLOSURE

A safety-belt buckle having a tongue adapted to be inserted endwise into a socket for engagement with an upwardly projecting spring-loaded flat latching plate which is pivoted in the base of the socket near the mouth thereof. The plate is rigidly connected by an arm to a finger piece that is exposed through an opening in the top of the socket so that it can be depressed to release the latching plate from the tongue. The tongue has a longitudinal slot through which the arm extends upwardly and is freely movable. The latching plate has latching edges facing away from the socket mouth and arranged to cooperate with locking edges on the tongue.

---

It is an object of this invention to provide an improved fastening of this kind which is reliable, simple and economical to produce compact and of neat appearance.

According to the present invention, there is provided a fastening of the kind referred to, wherein the tongue has transversely extending parts formed with locking edge surfaces facing in the direction away from the leading edge of the tongue, the spring-loaded latching means is constituted by a latching plate pivoted at one end thereof in the base of the socket and extending, in the direction away from the socket mouth, towards parts thereof formed with latching edge surfaces adapted, when the fastening is engaged, to cooperate with the locking edge surfaces of the tongue, and the movable part of the socket consists of a finger piece accessible through an opening in the top wall of the socket and rigidly connected to the latch plate by interconnecting means consisting of either an arm which, when the tongue is in the socket, is freely movable in a slot extending rearwardly into the tongue from the leading edge thereof or two spaced arms which, when the tongue is in the socket, are freely movable along opposite sides respectively of the tongue.

The invention will now be described by way of example with reference to the accompanying drawings, in which:

FIGS. 4, 5 and 6 are comparative diagrams illustrating the tongue and latch members of the fastening according to FIGS. 1 to 3 and those of two modifications of this fastening.

Figure 1:
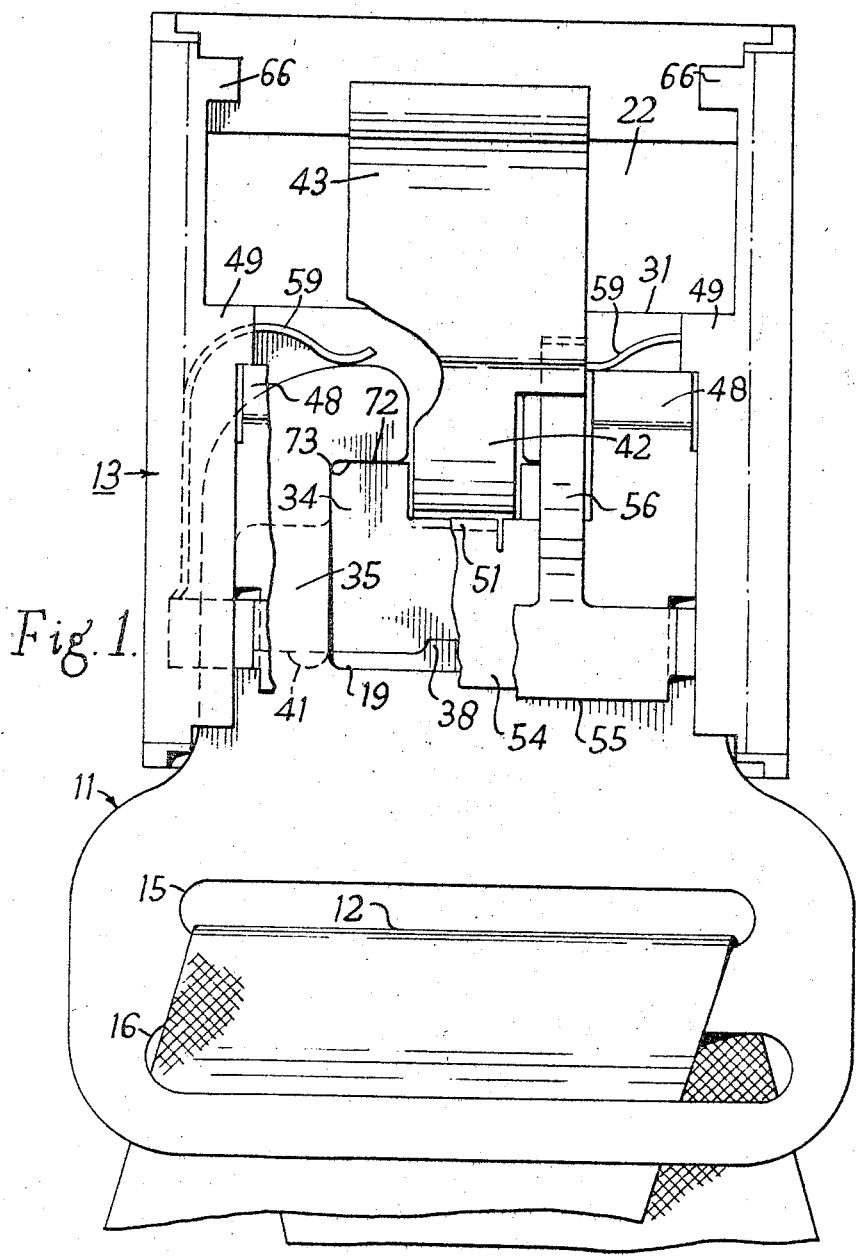
FIG. 1 is a plan view of the fastening with a top plate removed and other parts broken away, the fastening being shown in the engaged position.
Figure 2:
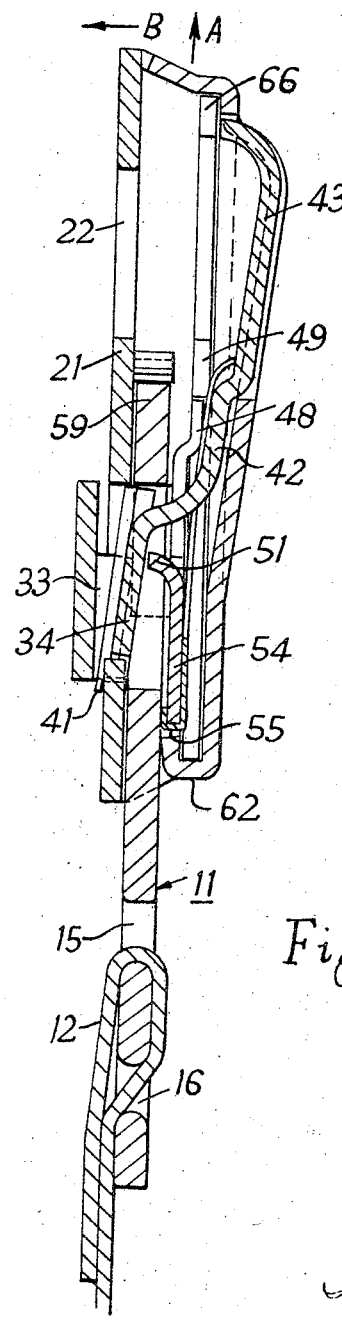
FIG. 2 is a longitudinal vertical section of the fastening shown in FIG. 1, but with the top plate in position.
Figure 3:
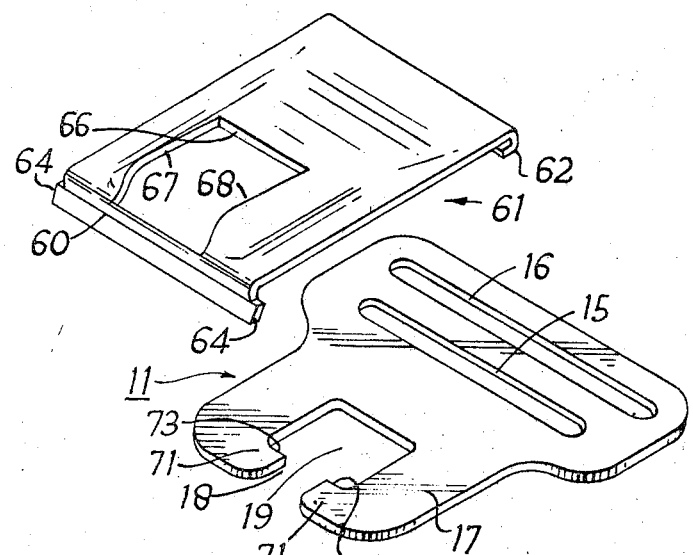
FIG. 3 is an exploded perspective view illustrating component parts of the fastening.
Figure 3:
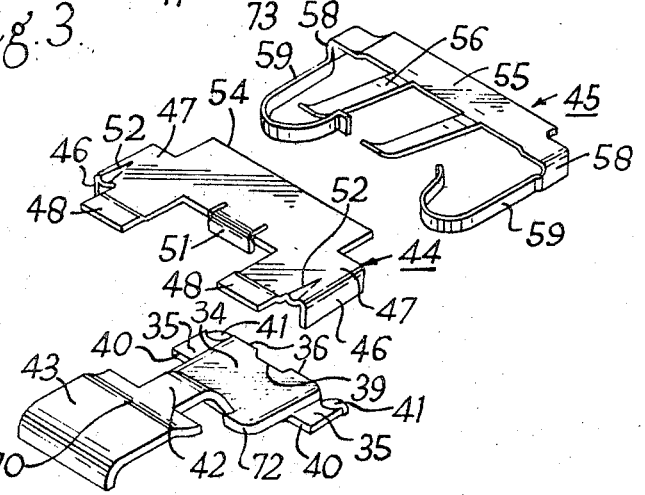
Figure 3:
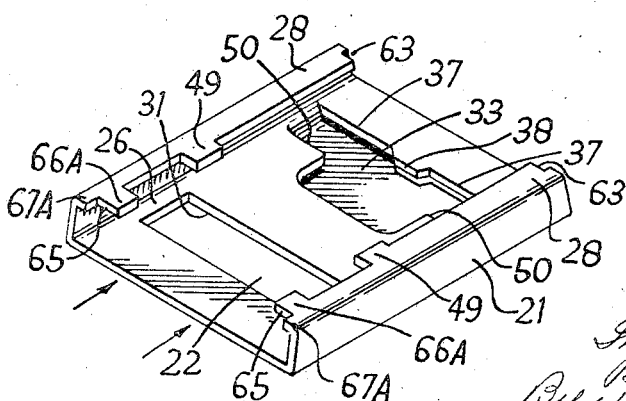

The belt fastening shown in FIGS. 1 to 3 comprises a tongue member, indicated generally by the reference 11, connected to a looped portion 12 of a webbing shoulder strap and a socket assembly, indicated generally at 13.

The tongue member 11 has an enlarged outer end portion formed with two parallel slots 15, 16 through which the looped end portion 12 of the shoulder strap is passed obliquely as shown in FIGS. 1 and 2. To allow for the oblique passage of the shoulder strap, the slot 16 is made wider than the slot 15. Projecting from this enlarged portion is a narrower portion 17 constituting the tongue proper, which narrower portion is formed with a longitudinal slot 18 extending from the leading end of the tongue to a latching aperture 19.

The socket assembly 13 has a main body portion 21 in the base of which is formed a rectangular opening 22 through which a looped strap end portion (not shown) passes upwardly and around an adjustable strap connector (not shown).

The socket body 21 has upwardly extending side portions, the top margins of which are bent over inwardly to form inturned flanges 28 parallel to the base of the body portion.

In the base of the main body portion 21 is formed with a recess 33 in which is located a latch member 34 in the form of a plate having bent down lateral margins carrying lateral projections 35. Edge parts 36 of the latch member are adapted to engage ledge parts 37 at one end of the recess 33. Between the ledge parts 37 is a short projection 38 which cooperates with a recess 39 between the edge parts 36 for locating the latch member. The lateral projections 35 have reduced thickness lugs 41 which engage as shown in FIG. 2 in a slot formed between the base of the recess 33 and the base of the remainder of the body portion 21. The edges 40 of the lateral projections 35 cooperate with edges 50 to prevent the latch member 34 from being displaced out of the recess 33 during insertion of the tongue into the socket. When the tongue 11 is engaged in the socket 13, the lateral projections 35 cooperate with its under surface to limit upward movement of the latch member 34 under heavy stress.

Integrally formed with the latch member 34 at the end thereof remote from the edges 36 is an arm 42 carrying a finger piece 43.

A retainer plate indicated generally at 44 has downturned lateral flanges 46 by which it is supported on the base of the main body portion 21 of the socket assembly, while top surface parts 47 above these lateral flanges are engaged beneath the inturned flanges 28 of the main body portion. Forwardly projecting arms 48, which are bent so that their front ends are located at a level, above the plane of the top of the retainer plate 44, engage abutment surfaces on projections 49 on the inturned flanges 28 of the body portion 21, so as to prevent the retainer plate from moving in the direction of insertion of the tongue member 11 beyond its correct position. The lower edge of a centrally located downwardly curved projection 51 on the retainer plate 44 cooperates with the latch member 34 near its junction with the arm 42 to limit upward tilting movement of the said latch member. Fluted depressions 52 in the portions of the retainer plate having the top surface parts 47 serve to limit upward tilting movement of the portions 17 of the tongue.

At the end thereof remote from the arms 48, the retainer plate 44 has a flat rectangular portion 54 having a transverse marginal portion over which is engaged a channel-section part 55 of the spring unit 45. Projecting forwardly from the top wall of the channel-section part 55 are two spring arms 56 which engage beneath the fingerpiece 43 and constantly urge the latter upward so as to tilt the latch member 34 into engagement with the lower end of the projection 51. The spring unit also has downwardly bent projections 58 on each side from which project horizontally two hook-shaped ejector springs 59. These ejector springs are located beneath the retainer plate 44 and on the inside of each of the two downturned flanges of the latter.

A cover plate indicated generally at 61 has a return bent flange 62 at one end which is adapted to engage over stepped end portions 63 of the inturned flanges 28 of the body portion 21. On the other end of the cover plate is a downturned flange 60 having short lateral projections 64 on both sides. When the cover plate 61 is fitted on the body portion 21, the flange 60 engages over the edges 65 of projections 66A on the inturned flanges 28 and the short lateral projections 64 engage in the ends of the channels formed between the base of the body portion 21 and cut back end parts 67A of the inturned flanges 28.

The top of the cover plate is inclined upwardly towards the edges 66, 67 and 68 of an opening through which finger piece 43 is exposed. A stepped portion 70 of the finger piece 43 is arranged to engage the margin of the under surface of the cover plate adjacent the edge 66 to enable the top surface of the finger piece to lie almost flush with the top surface of the cover plate 61 when the finger piece 43 is in the raised position.

A substantially rectangular socket mouth is formed between the base of the body portion 21 and the return-bent flange 62 of the cover plate 61. The return-bent flange 62 also serves to retain the assembly of the retainer plate 44 and the spring unit 45 against displacement in the direction opposite to that in which the tongue is adapted to be inserted into the socket.

In operation, when the tongue 11 is inserted into the socket 13, since its leading end is prevented from tilting upward by sliding engagement of the tongue portions 17 beneath the fluted depressions 52 of the retainer plate 44, the inturned parts 71 of the tongue will depress the latch member 34 against the action of the spring arms 56. In due course, these inturned parts 71 will ride over the front edges 72 of the latch member 34. Thereupon, the latch member 34 will be returned upwardly by means of the spring arms 56 into engagement with the projection 51 on the retainer plate while at the same time the lateral projections 35 on the latch member are caused to engage the under surfaces of parts of the tongue adjoining the lateral edges of the latching aperture 19. During this return movement of the latch member 34 the arm 42 will of course move upwardly through the slot 18 towards the aperture 19. In the meantime, the ejector springs 59 will have been compressed by the leading end of the tongue and, as soon as insertion pressure on the tongue is discontinued, they will urge the tongue back until the edges 73 thereof abut against the edges 72 of the latch plate as shown in FIGURE 1.

To disengage the fastening, all that is necessary is to depress the finger piece 43, thereby disengaging the edges 72 of the latch plate from the edges 73 of the tongue, whereupon the ejector springs 59 will operate to eject the tongue from the socket. The leverage effect, due to the distance between the latching edge 72 and the point where pressure is applied on the finger piece 43, enables the release load to be kept within standard requirement.

FIGS. 4, 5 and 6 are comparative diagrams in which FIG. 4 illustrates the arrangement of the tongue member 11 and latch member 34 of the embodiment already described, while FIGS. 5 and 6 illustrate alternative forms of tongue members and latch members. In FIGS. 5 and 6 the various parts are indicated by the same references as are used for similar parts in FIG. 4, but followed by the suffixes A and B respectively. As shown in FIG. 5, the latch member 34A is E-shaped in plan, the front edges 72A thereof which are engaged by the tongue 11A when the fastening is engaged are on the two outer limbs of the E and the cooperating edges on the tongue are constituted by front edges 73A of rectangular openings in the parts of the tongue on each side of the slot 18A. The arm 42A which connects the latch member 34A to the finger piece 43A is an extension of the central limb of the E and between this arm 42A and the outer limbs of the E are provided web portions having front edges 40A which extend below the level of the remainder of the latch member 34A and cooperate with front edge parts of a recess in the socket body portion (not shown) which recess is functionally similar to the recess 33 (FIG. 3), but of suitably modified shape to accommodate the E-shaped latch member 34A.

In the modification illustrated in FIG. 6, the tongue 11B is substantially T-shaped in plan and the locking edges thereof are constituted by rearwardly facing edges 73B of the cross-piece of the T. The latch member has depending curved side members 80 on both sides of latching portions provided with latching edges 72B adapted to cooperate with the locking edges 73B of the tongue. The latching portions are interconnected by a portion 35B which is functionally equivalent to the projections 35 in FIG. 4. The latch member is connected to a finger piece 43B by a yoke member 81. When the tongue 11B is inserted into the socket, its leading end part is first guided by the depending curved side members 80 towards the correct central position in the socket and then depresses the latch member until its locking edges 72B move past the latching edges 72B, whereupon the latch member is moved upwardly into a position in which the said edges 72B and 73B are in register with each other.

While the retainer plate 44 and spring 45 of the embodiment according to FIGS. 1 to 3 are applicable to the construction shown in FIG. 5, the arrangement of these parts is modified in the case of the construction shown in FIG. 6. In this case, the projection 51 alone serves to prevent the tongue 11B and subsequently the latch member from tilting upward beyond the desired position and the arms of the ejector spring are modified to cooperate with the relatively narrow leading edge of the tongue 11B.

What is claimed is:
1. A safety belt buckle comprising a socket having a baseplate, side walls and a cover formed with an opening, said socket being provided at one of its ends with a socket mouth and said baseplate having a depression adjacent the socket mouth, a tongue adapted to be inserted into and removed from said socket through said socket mouth, said tongue having a slot extending rearwardly from its leading edge and having transversely extending parts on each side of said slot with locking edges facing in the direction away from the leading end of said tongue, a flat latching plate pivoted at one of its ends in said depression in said baseplate and extending in the direction away from the socket mouth towards parts thereof formed with latching edges for cooperation with the locking edges on said tongue, resilient means biasing said latching plate in the direction to pivot upward towards said cover, a finger piece exposed through said opening in said cover, an arm extending from a part of said latching plate between said latching edges in the general direction away from the pivoted end of said latching plate and rigidly connecting said latching plate to said finger piece, said arm being arranged, when the tongue is in the socket, to extend through and be freely movable in said longitudinal slot in said tongue.

2. A belt buckle according to claim 1, wherein said depression in said baseplate is stamped out of said baseplate so that a slot is formed between the transverse edge of said depression nearer the socket mouth and reduced thickness lugs formed on the pivoted edge of the latch member are engaged in said slot.

3. A belt buckle according to claim 2, wherein said latch member has lateral portions on both sides of its junction with the said arm for cooperation with the under surface of the tongue to limit upward movement of said latching plate when said tongue is engaged in said socket.

4. A belt buckle according to claim 3, wherein said lateral portions of said latching plate are connected to those parts of said latching plate which are formed with said latching edges by bent down portions so that said lateral portions have their top surfaces at a lower level than said latching plate parts.

5. A belt buckle according to claim 4, wherein edges of the lateral portions at the ends remote from the pivoted end of the latching plate are arranged to cooperate with the transverse edge of said depression remote from the socket mouth to prevent displacement of the latching plate from pivotal engagement in said depression.

6. A belt buckle according to claim 4, wherein said reduced thickness lugs are provided on said lateral portions of said latching plate.

7. A belt buckle according to claim 2, wherein the side walls of said socket are integral with the baseplate and have inturned flanges on their upper edges and said cover has bent portions at its ends engaging beneath the ends of said inturned flanges.

8. A fastening according to claim 2, wherein there is provided, within the socket and adjacent the socket mouth, a bridge piece having a substantially flat top part extending between bent down flanges which lie close against the side walls of the socket, rest upon the baseplate of the latter and support said flat top part in engagement with the under surfaces of the inturned flanges thereof and wherein the said flat top part is provided on its underside with guide means for guiding the tongue during insertion thereof into the socket, so that when fully inserted, it will be at the correct distance from the socket base and also carries a stop arranged to cooperate with the latching plate to prevent upward movement thereof above the correct position for engagement of its latching edge surfaces with the locking edge surfaces of the tongue.

9. A fastening according to claim 7, wherein the flat top part of the bridge piece serves as a mounting for the resilient means by which the latching plate is spring-loaded in the direction towards the stop carried by said flat top part.

References Cited

UNITED STATES PATENTS

| | | |
|---|---|---|
| 2,948,939 | 8/1960 | Prete. |
| 2,954,634 | 10/1960 | Peschong. |
| 3,170,211 | 2/1965 | Van Noord. |
| 3,341,250 | 9/1967 | Rasmussen. |

FOREIGN PATENTS 818,988    8/1959    Great Britain.

BERNARD A. GELAK, *Primary Examiner.*